United States Patent
Zou et al.

(10) Patent No.: US 7,068,688 B2
(45) Date of Patent: Jun. 27, 2006

(54) ELECTRO-OPTIC Q-SWITCH

(75) Inventors: Yingyin Zou, Burlington, MA (US); Qiushui Chen, Medford, MA (US); Run Zhang, Acton, MA (US); Hua Jiang, Mansfield, MA (US)

(73) Assignee: Boston Applied Technologies, Incorporated, Woburn, MA (US)

( * ) Notice: Subject to any disclaimer, the term of this patent is extended or adjusted under 35 U.S.C. 154(b) by 289 days.

(21) Appl. No.: 10/700,934

(22) Filed: Nov. 4, 2003

(65) Prior Publication Data
US 2005/0094678 A1 May 5, 2005

(51) Int. Cl.
*H01S 3/115* (2006.01)

(52) U.S. Cl. ...................................... 372/12
(58) Field of Classification Search ............... 372/12
See application file for complete search history.

(56) References Cited

U.S. PATENT DOCUMENTS

| | | | | |
|---|---|---|---|---|
| 3,842,372 A * | 10/1974 | Pao et al. | ...................... | 359/276 |
| 5,180,378 A * | 1/1993 | Kung et al. | ...................... | 606/10 |
| 5,345,457 A * | 9/1994 | Zenzie et al. | ................... | 372/22 |
| 5,905,746 A | 5/1999 | Nguyen | | |
| 5,963,574 A * | 10/1999 | Gregor et al. | ................. | 372/75 |
| 6,268,303 B1 * | 7/2001 | Aitken et al. | .................. | 501/63 |
| 6,587,483 B1 | 7/2003 | Kittelmann | | |
| 2003/0002131 A1 | 1/2003 | Zou | | |
| 2003/0058552 A1 * | 3/2003 | Schreiner | .................... | 359/824 |
| 2003/0081636 A1 | 5/2003 | Wang | | |

OTHER PUBLICATIONS

Maris Ozolinsh, et al., "Q-switching of Er:YAG (2.9 um) Solid-state Laser by PLZT Electrooptic Modulator," IEEE J. Quantum Electron., Oct., 1997 vol. 33, No. 10.*

Gary Y. Wang, et al., "Low-voltage electro-optic Q switching of 1.06um microlasers by PLZT," Digest of CLEO98, p. 485-6, May 3-8, 1998 (San Francisco, CA).*

* cited by examiner

*Primary Examiner*—Minsun Oh Harvey
*Assistant Examiner*—Jeffrey Lane

(57) ABSTRACT

An electro-optic Q-switch for generating sequence of laser pulses was disclosed. The Q-switch comprises a quadratic electro-optic material and is connected with an electronic unit generating a radio frequency wave with positive and negative pulses alternatively. The Q-switch is controlled by the radio frequency wave in such a way that laser pulse is generated when the radio frequency wave changes its polarity

8 Claims, 5 Drawing Sheets

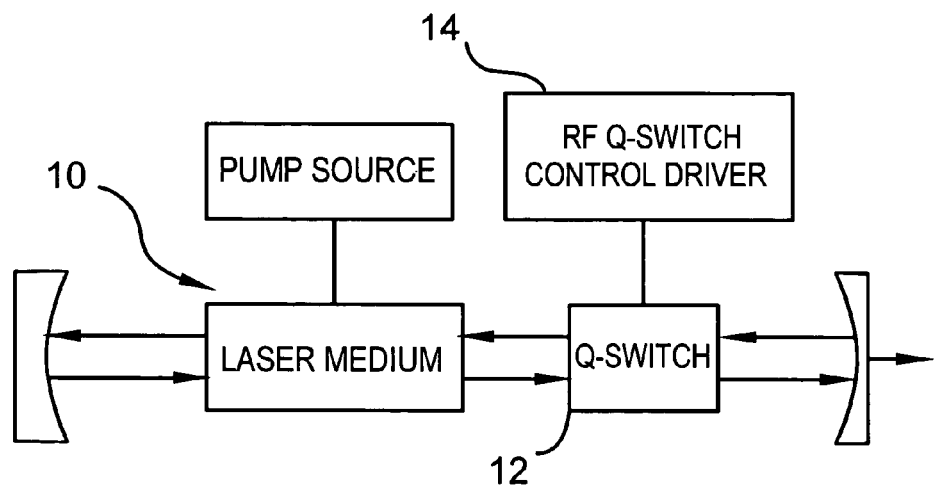
FIG. 1A
(Prior Art)
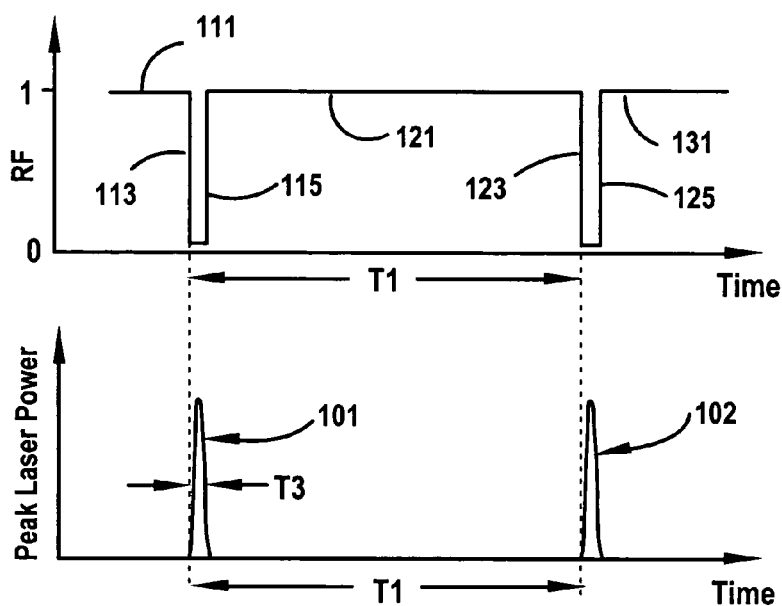
FIG. 1B
(Prior Art)
FIG. 1C
(Prior Art)

ELECTRO-OPTIC Q-SWITCH

STATEMENT OF GOVERNMENTAL INTEREST

This invention was made with Government support under contract no. NAS1-03035 awarded by NASA. The government has certain rights in this invention.

BACKGROUND OF THE INVENTION

1. Technical Field

The present invention relates to generate laser pulse trains using a Q-switch in a continuously pumped laser, particular to generate laser pulse trains in a continuously pumped laser using a Q-switch made by a quadratic electro-optic material and driven by a dual-polarity radio frequency (RF) control signal.

2. Technical Background

Among the methods to generate laser pulse trains, Q-switching is one of the most common schemes. In this scheme, the continuously pumped laser output is turned off by increasing the resonator loss (spoiling the resonator quality factor Q) periodically with the help of a modulated loss inside the resonant cavity. The Q-switching is a loss switching. Because the pump continues to deliver constant power at all time, energy is stored in the atoms in the form of an accumulated population inversion during the off (high-loss)-times. When the losses are reduced during the on-times, the large accumulated population is released, generating intense (usually short) pulses of light.

Several methods were used to Q-switch the laser pulses. A passive Q-switch, such as a saturable-absorber Q-switch (also known as a dye-cell Q-switch) uses some form of light absorbing material that saturates when the gain inside the cavity exceeds a certain level, at which time the laser begins oscillating. The dye then quickly drops below its saturation level and oscillation stops. The process automatically repeats to produce successive laser output pulses without the need for any external energy or control. Passive Q-switches are widely used because they are simple, but they have significant limitations, such as pulse-by-pulse amplitude fluctuation and no control over frequency of Q-switching or output pulse width.

The active Q-switches exhibit much stable performance. One example is an electro-optic (EO) Q-switch uses EO crystal, mainly KDP or $LiNbO_3$ crystal which becomes birefringent when subjected to high electric voltage to create a cavity loss. Although this Q-switching technique is fast and precise, thus providing control over the peak output pulse width independent of output pulse frequency, it has some disadvantages. Because of the small EO coefficient associated with the materials, the radio frequency (RF) control voltage is high, usually in the kilovolts range, a very high power source and a mean of high voltage isolation are needed. It is difficult to generate laser pulse trains with very high pulse repetition frequency (PRF).

The other approach of Q-switching is an acousto-optic (AO) Q-switch. AO Q-switching techniques use an acousto-optic modulator to produce an RF acoustic wave in order to Bragg-diffract the light out of the cavity. This technique is simple and operates well at MHz PRF, but with the fixed or discrete frequency.

Although there have been many advances in the field of Q-switching, there is still a need for a Q-switching technique that has high PRF at desired frequency, low control voltage, compact size and low in cost.

SUMMARY OF THE INVENTION

One aspect of the invention is to form an EO Q-switch by means of an electric voltage controlled quadratic electro-optic materials, such as La doped PMN-PT.

In another aspect, the current invention includes a Q-switch that has a PRF of up to 200 KHz and Q-switching control voltage lower than 100V.

In yet another aspect of the invention is that the Q-switch is driven by a RF control voltage with both positive and negative pulses to produce laser pulses with doubled PRF.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIGS. 1A, 1B and 1C schematically illustrate a prior-art of an EO Q-switched laser, and timing-diagrams for operating the Q-switch to generate the laser pulses.

DETAILED DESCRIPTION OF THE PREFERRED EMBODIMENTS

Figure 2:
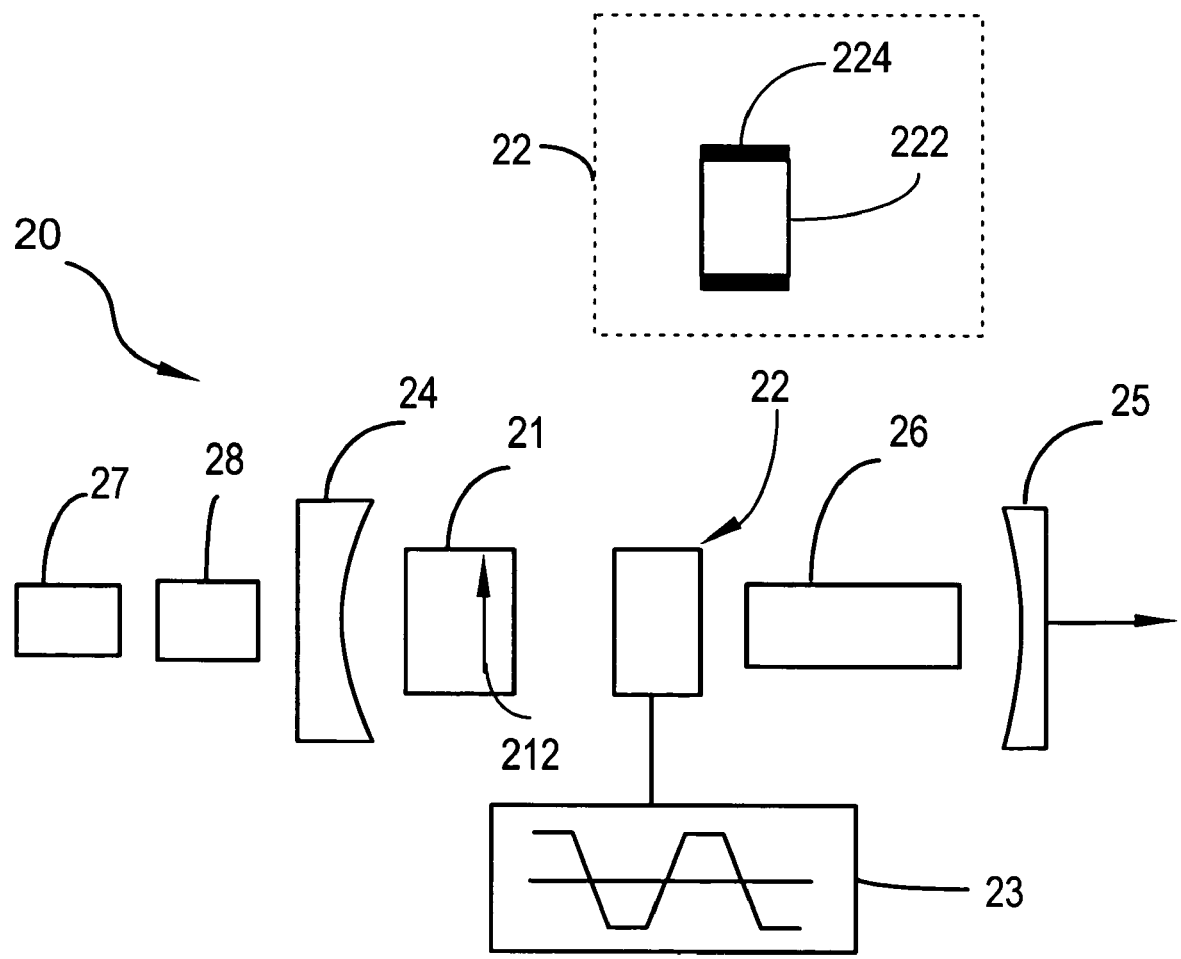
FIG. 2 is a schematic diagram illustrating of the Q-switched diode pumped solid-state laser using a Q-switch in accordance with the present invention.

In prior-art laser 10 illustrated in FIG. 1A has a conventional active Q-switch 12 that is externally driven by a high-power switch control driver 14. The Q-switch includes acousto-optic (AO), electro-optic (EO) and magneto-optic (MO) switching device.

A common prior-art method of operating Q-switch 12 to deliver a sequence of pulses from laser 10 is schematically illustrated by timing-diagrams in FIGS. 1B and 1C. FIG. 1C depicts first and second sequential pulses 101 and 102 in a sequence of such pulses that may number in tens or hundreds. FIG. 1B depicts the Q-switch operation that provides the pulse. The RF level required to close the Q-switch, or high loss status, is designated 1, with a level 0 indicating that the Q-switch is open, or low loss status. The Q-switch is maintained in a "normally-closed" condition (line 111). The Q-switch is then opened as indicated (line 113) allowing the delivery of pulse 101. Pulse 101 occurs as a result of energy being stored in the gain-medium because of continuous pumping without extraction of laser radiation. The switching time for opening the Q-switch, i e., the time taken to transition from 0 to 1 in FIG. 1B, depends on the capability of the RF driver 14, and is on the order of 10 nanoseconds (ns). The laser pulse-width T3 is in a range from a few nanosecond to hundreds of nanoseconds, depending on the resonator configuration, the gain-medium, pump power and pump configuration. The Q-switch is then closed (line 115) to prevent further delivery of laser radiation, thereby returning the Q-switch to the normally-closed condition after the pulse is delivered (line 121). The Q-switch is then opened again (line 123), after a time T1 following the previous opening, to allow delivery of pulse 102. The Q-switch is then closed (line 125) after delivery of the pulse and maintained in the normally-closed condition (line 131). This procedure is repeated until delivery of the remaining pulses in the sequence is complete. The repetition rate PRF of pulses in the sequence is 1/T1.

For an EO Q-switch, the laser beam inside the laser resonant cavity should be polarized and the on-off switching is realized via voltage induced phase shift of the EO elements.

FIG. 2 illustrates schematically a solid-state laser 20 comprising an laser crystal 21, such as Nd:YVO$_4$, pumped by a source 27 comprising diode lasers and coupled into the laser crystal 21 through a optic focusing elements 28, and an EO Q-switch 22 inside a typical laser cavity defined by mirrors 24 and 25. A RF Q-switch driver 23 with dual-polarity was used to drive the Q-switch 22. The Q-switch 22 comprises an EO element 222 with quadratic EO coefficient and a pair of electrodes 224. The optical axis of EO element 222 is 45° aligned to the c-axis 212 of the Nd:YVO$_4$.

When no voltage is applied to the electrodes 224 of the Q-switch 22, The vertically (c axis 212 of YAG) polarized emission passes the Q-switch undisturbed, and the laser is "on". When a voltage is applied, the induced birefringence equals $-0.5n^3RE^2$, where n is the refractive index, R is the quadratic EO coefficient and E is the electric field generated by the applied voltage V across the EO element 222. When the induced birefringence adds a $\pi$ phase shift onto the passing emission (two passes per round trip with $\pi/2$ phase shift), the polarization of the emission rotates to horizontal direction when it comes back to the laser crystal, experiencing zero amplification, or have a maximum loss, and the laser is "off".

Figure 3A:
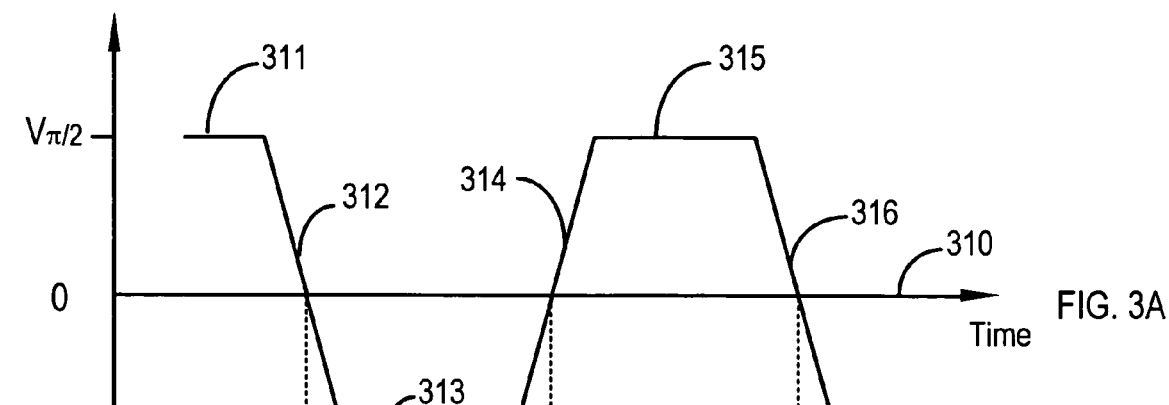
FIGS. 3A, 3B and 3C are timing-diagrams schematically illustrating a Q-switching method in accordance with the present invention for operation the Q-switch of FIG. 2 to generate the laser pulses.
Figure 3B:
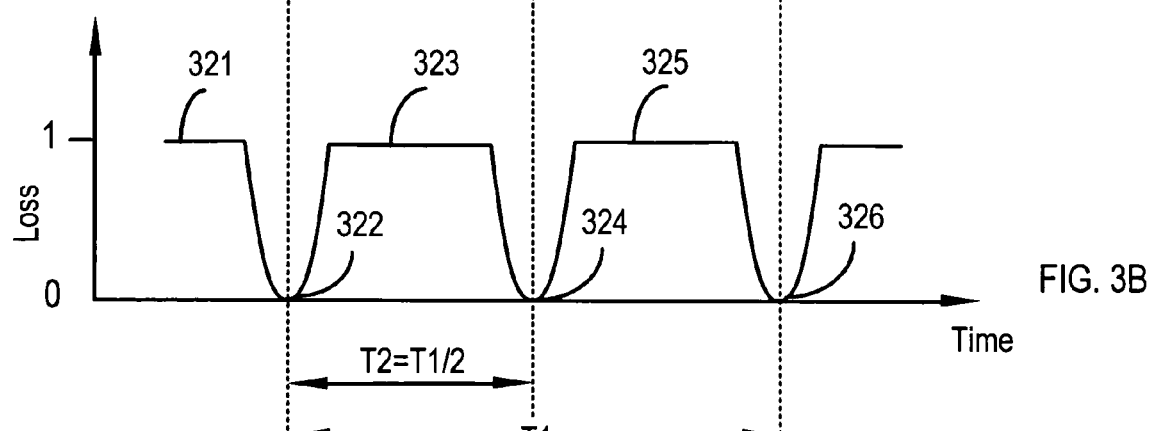
Figure 3C:
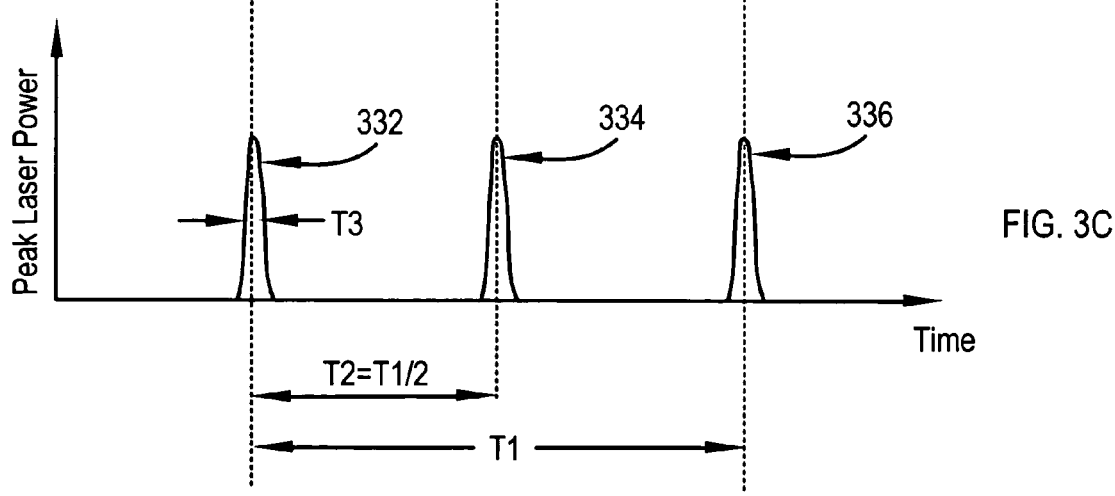

A preferred embodiment of the inventive method of operating Q-switch 22 to deliver a sequence of pulses from laser 20, is schematically illustrated by timing-diagrams 3A, 3B and 3C. A dual-polarity quasi-square wave RF driving voltage with alternate positive and negative pulses of amplitude of $V_{\pi/2}$ and a time period of T1 is used to drive the Q-switch (FIG. 3A), where $V_{\pi/2}$ is the voltage required for the EO element 222 to produce a $\pi/2$ phase shift. Here, initially, Q-switch 22 is being maintained in a "normally-closed" condition with a high cavity loss (see FIG. 3B line 321) at driving voltage $V_{\pi/2}$ (FIG. 3A line 311). Total $\pi$ phase shift is added on the emission per round trip. As the applied voltage decreasing (line 312), the induced phase shift is decreased. The emission gain is increased and the cavity loss is reduced. When the RF voltage reduces to zero, the cavity loss is at the lowest point 322 (FIG. 3B). The Q-switch is turned on before the voltage reaches zero line 310 when the emission gain is greater than the cavity loss and a short pulses 332 is produced. The preferred EO element 222 is a quadratic material, i.e. when applied either negative or positive voltage to the material, it create the same phase shift. When the applied voltage is changed from negative to positive, the phase shift reaches a minimum. With the driving voltage increasing negatively, the induced phase shift increases and the cavity loss increases as well. When the control voltage approaches to $-V_{\pi/2}$ (FIG. 3A line 313), the cavity loss is high (line 323) and the laser is turned off.

The Q-switch is then opened again when the driving voltage changing its polarity from negative to positive (line 314) across the zero line 310, the cavity loss is low (FIG. 3B line 324) and second pulse 334 is generated. The Q-switch is then total closed again (line 315) and the cavity loss is high (line 325). The next pulse 336 is generated when the RF driving voltage 316 crossing the zero line 310 and reaching the low cavity loss 326 after T1 time interval. The repetition rate PRF of pulses in the sequence is 2/T1, twice as that of the prior art. With a RF signal of T1=2 microseconds (µs), or a frequency of 500 KHz, the output laser pulse train will have a PRF of 1 MHz.

The pulse widths T3 of 332, 334 and 336 can be varied by adjusting the driving voltage slopes 312, 314 and 316, respectively.

In a laser system with unpolarized light, a polarizer (not shown in here), such as PolarCor® polarizer from Corning Inc. (Corning, N.Y.), can be attached in front of the EO element with 45° aligned to the optical axis of the EO element.

A frequency-doubling crystal 26, such as KTP, can be further incorporated into the laser cavity to produce frequency doubled laser beam pulses.

The general requirement for the EO element 222 for use as Q-switch is that, when a voltage is applied, a phase shift of $\pi/2$ is produced per trip of the laser beam. Also the material is isotropic with no voltage applied, there is no residual birefringence to cause the initial phase shift of the laser beam. Preferably, the material has a high electro-optic coefficient in order to reduce operating voltages to less than 500 volts. Also, the material has a quadratic EO coefficient to take advantage of the inventive Q-switching driving method. Preferably, the mechanical characteristics allow formation of a bar or plate for use as the electrode. Of course, the material must be transparent at the wavelength of interest, e.g., between 500 nm and 1700 nm for most of the laser applications.

These requirements are satisfied by a class of ferroelectric complex oxides which 1) are optically isotropic with no voltage applied; 2) have a Curie temperature less than about 490° C., so that electro-optic coefficients are high near room temperature; 3) have a diffusive phase transition, so that the temperature dependence of the electro-optic coefficients is lessened; and 4) which are not permanently poled by moderate electric fields since materials with a low Curie temperature that become permanently poled are less stable. Example material systems include lanthanum modified solid solution of lead manganese niobate and lead tantalate (La: PMN-PT, or PLMNT), lanthanum modified lead zirconate titanate (PLZT), and lanthanum modified solid solution of lead zinc niobate and lead tantalate (La:PZN-PT, or PLZNT). These materials are available from Corning Inc. (Corning, N.Y.) and Boston Applied Technologies, Inc. (Woburn, Mass.), referenced as OptoCeramic® materials.

The preferred OptoCeramic® material is PLMNT with a nominal 3.5/75/25 La/PMN/PT composition. For reference purposes nominal values for this PLMNT are n=2.48 and R=11.5×10$^{-16}$ m$^2$/V$^2$ at 1.06 µm and n=2.458 and R=6.86× 10$^{-16}$ m$^2$/V$^2$ at 1.55 µm, both at 23° C. PLMNT has a polycrystalline structure with crystal sizes ranging from about 5 to 20 microns. In the form of hot-pressed ceramics, it is optically isotropic and exhibits little birefringence with zero applied voltage.

Another preferred OptoCeramic® material is PLZT with a nominal 9.75/65/35 La/Pb/Zr composition. It is also commercially available as hot pressed ceramic plates from Alpha Ceramics (Minneapolis, Minn.).

Figure 4:
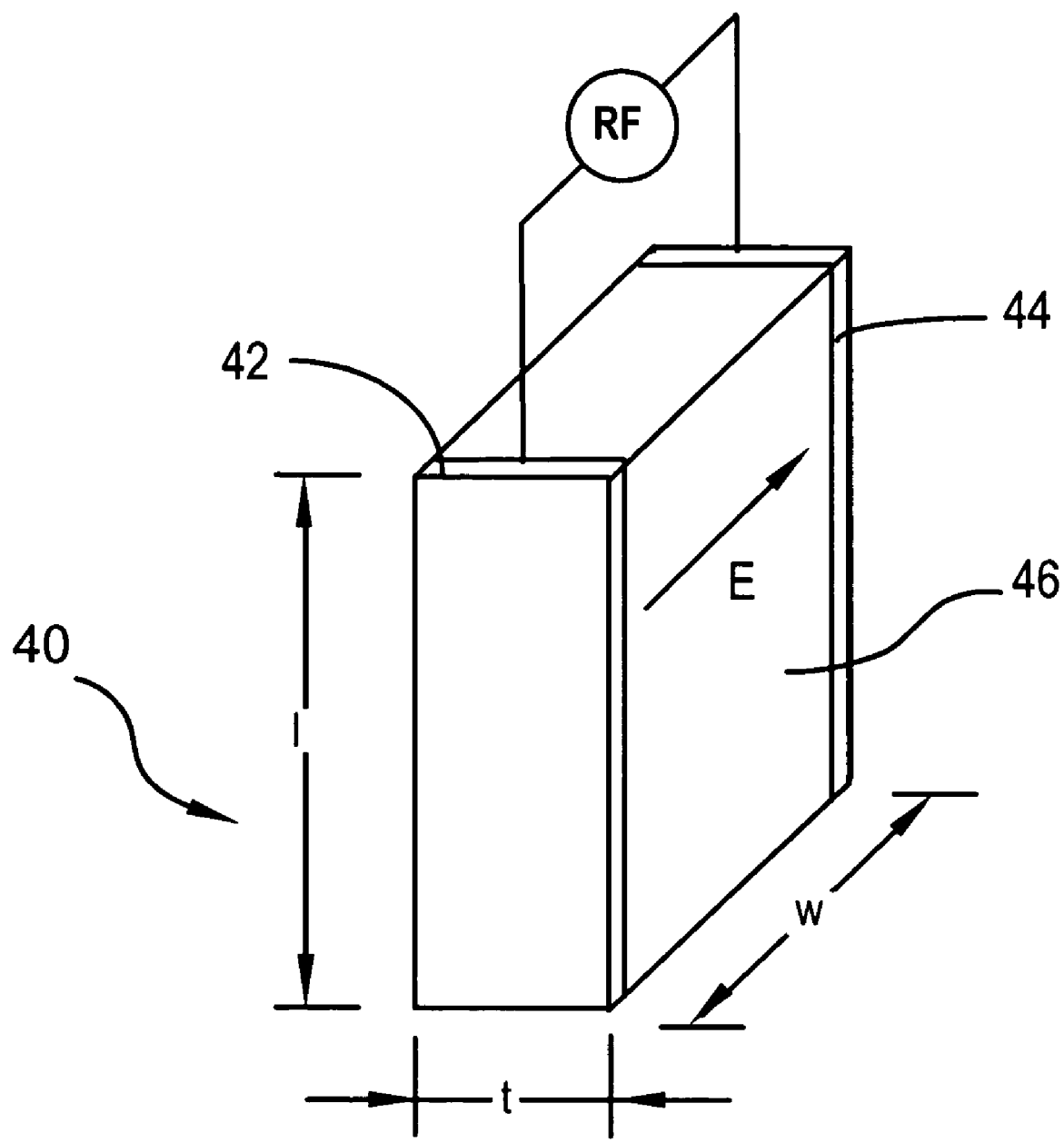
FIG. 4 is a perspective view illustrating an embodiment of the Q-switch 22 of FIG. 2 in accordance with the present invention.

An electrode geometry of the Q-switch which takes advantage of these materials is illustrated by the transverse field configuration illustrated in FIG. 4 where the electrodes 224 of FIG. 2 are illustrated as a pair of metallized electrodes 42 and 44. A plate 40, for use as the EO Q-switch 22 of FIG. 2, is shown which has thin metallized electrodes 42 and 44 on the both sides, respectively, of a block section 46 of EO material. The electrodes 42 and 44 are shown connected to a RF driving voltage. The electric field (designated E) is 90° to the direction of light propagation. Since the effect is based on the electric field in the material, it is desirable to arrange the electrodes as close together as possible to minimize the control voltage. The optical axis of the EO element is perpendicular to the electric field.

EXAMPLE

The PLMNT plate with metallized electrodes has dimensions where the width (w) between the electrodes is about 0.5 mm, a thickness (t) of about 1.38 mm, and a length (l) of about 2 mm. Such a dimensioned PLMNT plate has an insertion loss of about 0.1 dB and Q-switching voltage of 100V for a 1.06 µm wavelength laser at 23° C.

It will be understood that the particular geometry described is an example and that other device geometries can be used. Different dimensions of w and t can be selected to provide the same π round trip phase shift with different switching voltage. The other preferred PLMNT plate has dimensions of a width (w) of about 0.4–3 mm, a thickness (t) of about 1.30–3 mm, and a length (l) of about 1.0–3.0 mm.

Figure 5A:
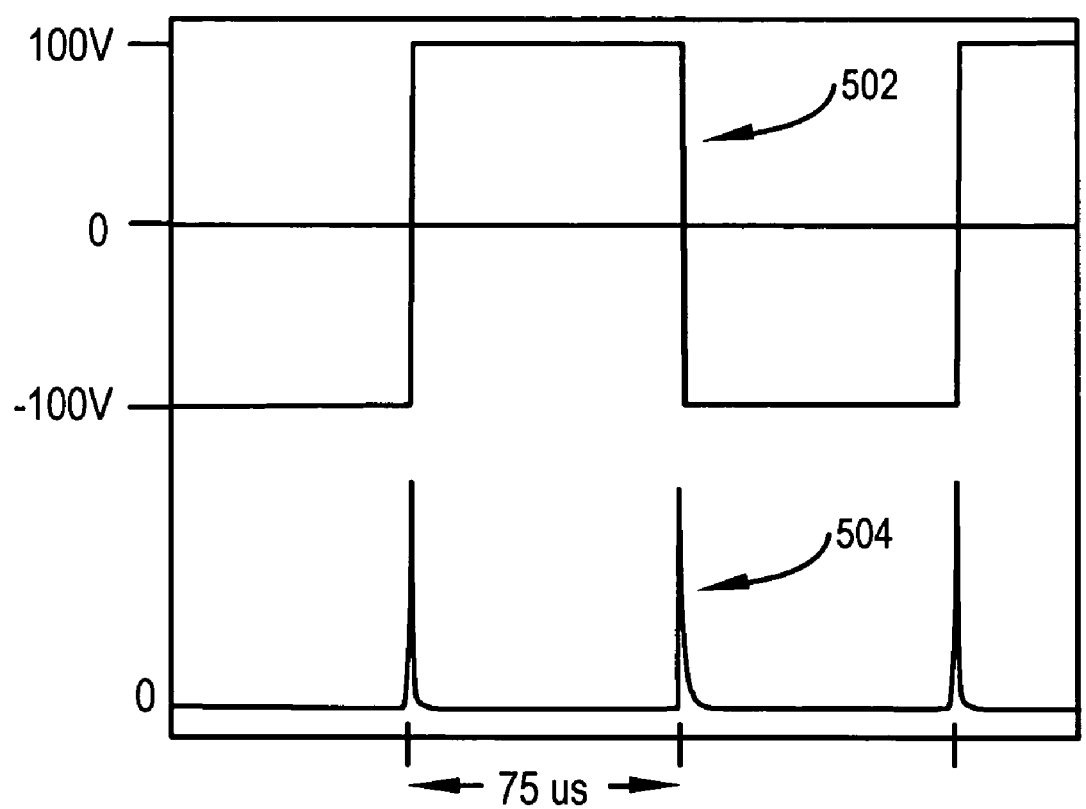
FIGS. 5A and 5B are measured characteristics of the Q-switching method in accordance with the present invention.

The present inventive Q-switching method was tested using the diode pumped solid state laser setup as shown in FIG. 2, with a PLMNT Q-switch with aforementioned composition and dimensions. The result is shown in FIG. 5A. A quasi-square wave with ±200V output was built and used to drive the Q-switch. The voltage need to Q-switch the laser beam is about 100V (line 502). The sequence of laser pulses were measured using a model 1801 high-speed photoreceiver from New Focus of San Jose, Calif. A model TDS 210 60 MHz oscilloscope from Tektronix of Beaverton, Oreg., was used to record the traces. Laser pulse trains 504 were produced when the RF driving voltage 502 changes the polarity.

Figure 5B:
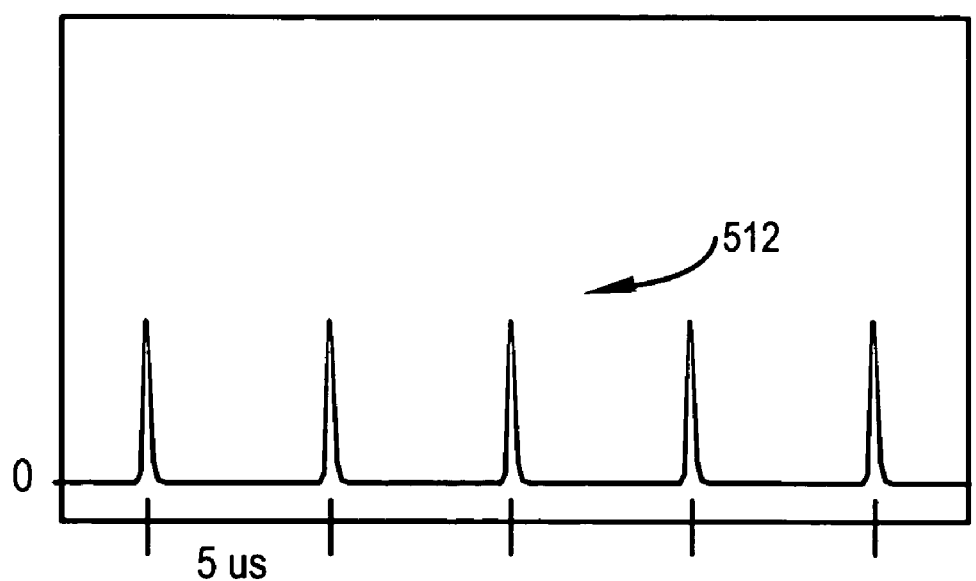

Referred in FIG. 5B is laser pulse trains 512 with PRF of 200 KHz generated with the Q-switch.

Although particular embodiments of the invention have been described and illustrated herein, it is recognized that modifications and variations may readily occur to those skilled in the art. For example, the RF driving signal can have positive and negative pulses with different frequency, or have zero voltage level while it crosses the zero line 310 in FIG.3A. The RF signal can also be in the different wave shape, such as sinusoidal or triangle waves. The suitable laser cavity could be in the form of fiber laser.

What is claimed is:

1. A Q-switch laser apparatus to deliver a sequence of laser pulses comprising:
   a laser cavity formed by a pair of reflective surfaces;
   a laser gain medium mounted in said laser cavity;
   optic coupling elements;
   a continuous optical pump radiation source whose pump radiation is coupled through said coupling elements in said laser gain medium;
   a quadratic electro-optic Q-switch mounted in said laser cavity, wherein the Q-switch comprises a La modified PMN-PT material;
   said Q-switch being connected with an electronic unit generating a radio frequency wave with positive and negative pulses alternatively; and
   said Q-switch being controlled by the radio frequency wave in such a way that laser pulse is generated when the radio frequency wave changes its polarity.

2. The Q-switch defined in claim 1 further comprises La modified PMN-PT with the composition of 3.5/75/25.

3. The laser apparatus in claim 1 wherein said La modified PMN-PT electro-optic Q-switch operates at a voltage of 500 volts or less.

4. The laser apparatus in claim 1 wherein said La modified PMN-PT electro-optic Q-switch operates at a pulse repetition frequency up to 1 MHz.

5. The laser apparatus in claim 1 wherein said La modified PMN-PT electro-optic Q-switch operates at a laser wavelength from 530 nm to 3000 nm.

6. The laser apparatus in claim 1 wherein said La modified PMN-PT electro-optic Q-switch comprises a plate with a width (w) of about 0.4–3 mm, a thickness (t) of about 1.30–3 mm, and a length (l) of about 1.0–3.0 mm; the plate having electrodes for applying an operating voltage less than 500 volts.

7. Q-switch laser apparatus to deliver a sequence of laser pulses comprising:
   a laser cavity having a pair of reflective surfaces;
   a laser gain medium mounted in said laser cavity;
   optic coupling elements;
   a continuous optical pump radiation source whose pump radiation is coupled through said coupling elements in said laser gain medium;
   a quadratic electro-optic Q-switch mounted in said laser cavity, wherein the Q-switch comprises a La modified PMN-PT material;
   said Q-switch being connected with an electronic unit generating a radio frequency wave with positive and negative pulses alternatively;
   said Q-switch being controlled by the radio frequency wave in such a way that laser pulse is generated when the radio frequency wave changes its polarity; and
   a polarizer mounted to said Q-switch.

8. A Q-switch laser apparatus to deliver a sequence of laser pulses comprising:
   a laser cavity having a pair of reflective surfaces;
   a laser gain medium mounted in said laser cavity;
   a frequency doubling KTP mounted in said laser cavity;
   optic coupling elements;
   a continuous optical pump radiation source whose pump radiation is coupled through said coupling elements in said laser gain medium;
   a quadratic electro-optic Q-switch mounted in said laser cavity, wherein the Q-switch comprises a La modified PMN-PT material;
   said Q-switch being connected with an electronic unit generating a radio frequency wave with positive and negative pulses alternatively; and
   said Q-switch being controlled by the radio frequency wave in such a way that laser pulse is generated when the radio frequency wave changes its polarity.

* * * * *